United States Patent
Mrotek et al.

[11] Patent Number: 5,558,958
[45] Date of Patent: Sep. 24, 1996

[54] FLEXIBLE CORE SPACER FOR STORAGE BATERIES

[75] Inventors: Edward N. Mrotek, Grafton; Norbert Schilling, Milwaukee, both of Wis.

[73] Assignee: Globe-Union, Inc., Milwaukee, Wis.

[21] Appl. No.: 322,234

[22] Filed: Oct. 13, 1994

[51] Int. Cl.$^6$ .................................................. H01M 2/18
[52] U.S. Cl. ..................... 429/146; 429/147; 429/143; 429/66
[58] Field of Search .................................. 429/146, 147, 429/143, 66

[56] References Cited

U.S. PATENT DOCUMENTS

| | | |
|---|---|---|
| 532,128 | 1/1895 | Willard . |
| 712,178 | 10/1902 | Chamberlain . |
| 1,171,597 | 2/1916 | Davis . |
| 1,422,815 | 7/1922 | Beck . |
| 1,474,761 | 11/1923 | Campbell et al. ........................ 429/147 |
| 1,861,467 | 6/1932 | Bennen et al. ........................... 429/143 |
| 2,909,588 | 10/1959 | Rolph ........................................ 429/147 |
| 3,607,440 | 9/1971 | Olmstead et al. . |
| 4,328,945 | 5/1982 | Perkins . |
| 4,368,243 | 1/1983 | O'Rell et al. ............................ 429/147 |

FOREIGN PATENT DOCUMENTS

| | | |
|---|---|---|
| 55-143775 | 11/1980 | Japan . |
| 59-56354 | 3/1984 | Japan . |
| 59-209281 | 11/1984 | Japan . |

*Primary Examiner*—Stephen Kalafut
*Assistant Examiner*—Richard H. Lilley
*Attorney, Agent, or Firm*—Harness, Dickey & Pierce, P.L.C.

[57] ABSTRACT

A flexible spacer for positioning a cell element in a cell compartment of a container of a storage battery includes a sheet member folded over on itself to a U-shaped configuration with the space between opposing surfaces of the sheet member defining a compartment for receiving the cell element, enabling the cell element and the spacer to be inserted as a unit into the cell compartment, the opposing surfaces of the sheet member each including a ribbed section that flexes upon insertion of the spacer and element into the cell, automatically adjusting for differences in cell element thickness.

17 Claims, 3 Drawing Sheets

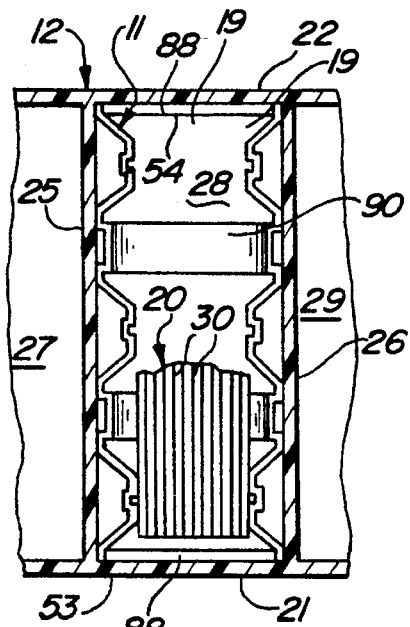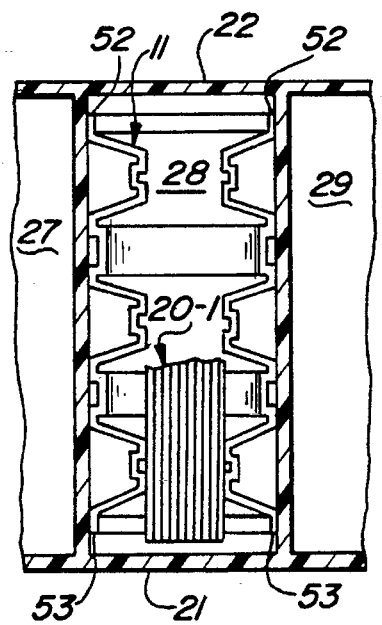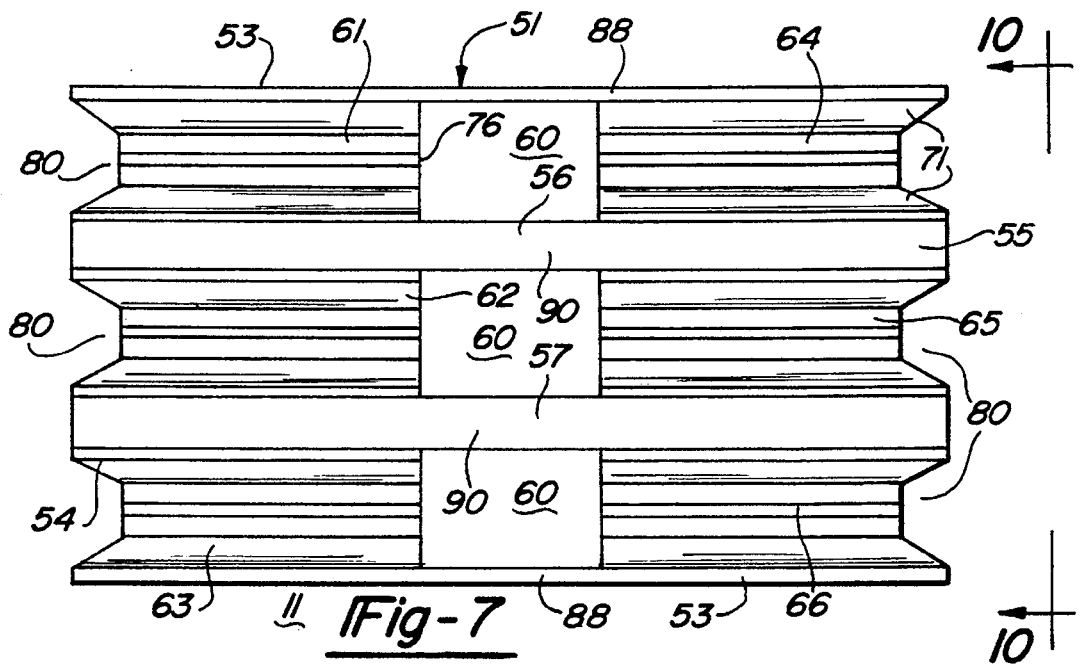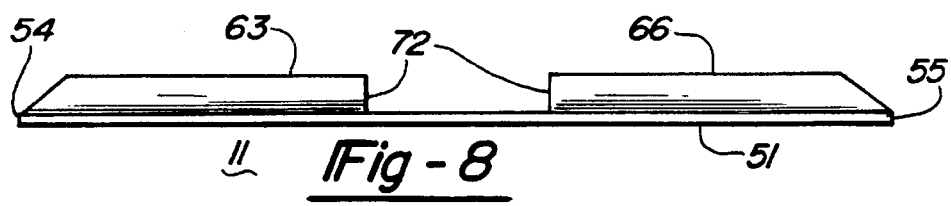

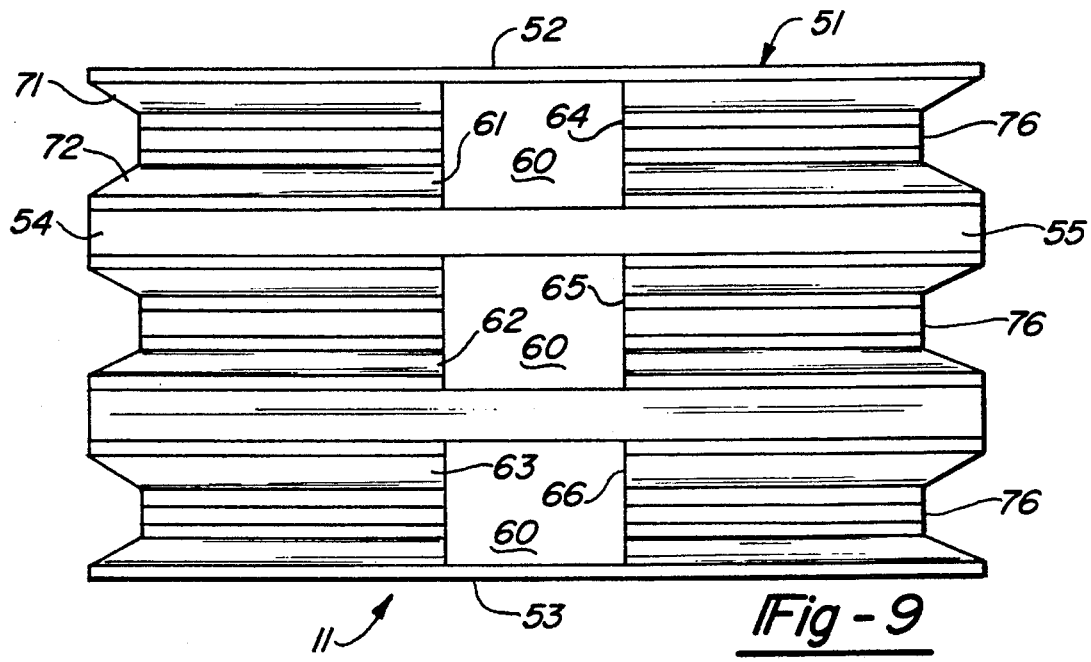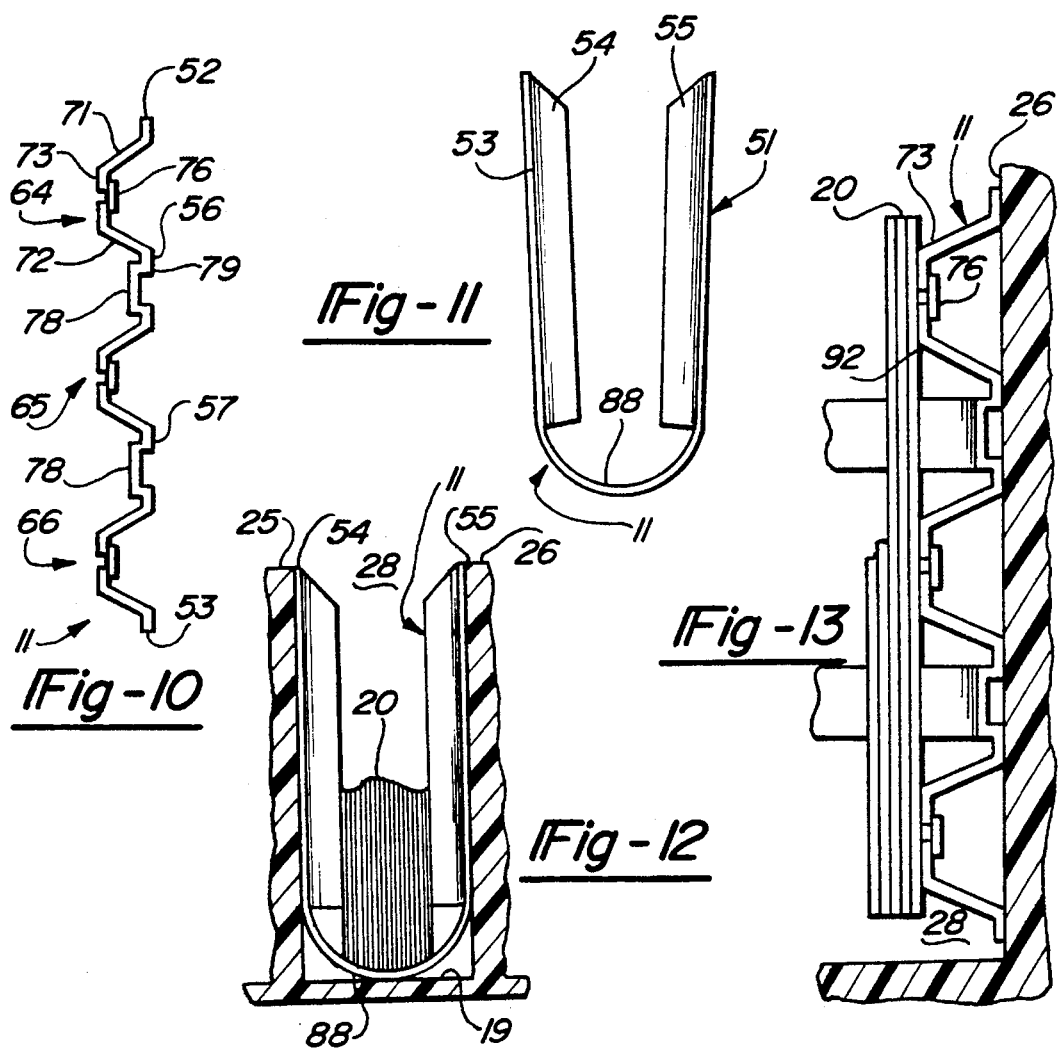

FLEXIBLE CORE SPACER FOR STORAGE BATERIES

BACKGROUND OF THE INVENTION

This invention relates to storage batteries, and more particularly, to a flexible spacer for spacing a core or cell element of the battery in a cell compartment of such batteries.

Conventional storage batteries are produced in different size categories and have standardized outside dimensions for each size. Battery manufacturers typically provide batteries with varying energy capacities in each size category. This is done by varying the number of positive and negative plates in each cell element of the battery. Traditionally, each cell element in a lower energy battery contains approximately ten plates and each cell element in higher energy batteries contains approximately fifteen plates. Each cell element is spaced from the walls of the cell compartment and is firmly held substantially centrally therein by ribs that are internally molded to extend normal to the container walls. The size of the ribs defines the width of the compartment, with wider ribs being used for compartments containing thin cell elements and smaller ribs being used for compartments containing thicker cell elements. Varying the number of plates in turn varies the thickness of the cell element that must be positioned and firmly retained in the cell compartments of the battery.

A further consideration is that in the process of inserting a multi-plate cell element into a container cell compartment, there is a tendency to squeeze the multi-plate element at its upper edge where it is held, causing the bottom portion of the plates of the element to fan out, making it more difficult to position the bottom edges between the fixed ribs at the bottom of the cell.

Because many customers require different size cores for batteries purchased, battery manufacturers must maintain a large inventory of battery containers to accommodate all of their customers. To provide a broader line of battery models, battery manufacturers have to stock at least one case mold for each battery model it sells. In many instances, the battery containers for each size battery are alike except for the size of the core spacing ribs that are molded integrally with the inner walls of the cell compartments. The rib sizes for different containers differ in fractions of inches. Accordingly, there is the possibility that the wrong sized container will be used in assembly of different battery models.

Other manufacturers inventory a lesser number of molds and incorporate inert separators into each cell element to add thickness to cell elements having a fewer number of plates. The thickness of the separator is changed to accommodate fewer or more plates in an element. However, proper performance of the cell element requires that the separation between the plates of the cell element be consistent so that the resistivity of the plates is maintained the same and at a low value. Therefore, changing the separator thickness usually affects the electrical performance of the battery. A further consideration is that when a rigid spacer is used to maintain a fixed spacing between components of the core elements of a battery, the cell elements are more affected by vibration.

In the U.S. Pat. No. 3,607,440, which was issued to Fred P. Daniel et al. on Sep. 21, 1971, and in the U.S. Pat. No. 4,309,818, which was issued to Richard H. Kline on Jan. 12, 1982, there are disclosed battery containers in which the cell walls of the battery container are provided with integrally molded flexible ribs that are adapted to flex to conform to the thickness of the core element. The battery containers are produced by injection molding. The flexible ribs compensate for variations in thickness of the core element so that the number of different sized containers is reduced. In addition, the wider the core element, the greater the flexure of the ribs, and hence, the greater the force that is applied to the larger number of plates.

Although containers having flexible ribs integrally molded with the sidewalls and inner partitions of the container automatically compensate for variation in cell element thickness, these containers are difficult to produce by injection molding, and require use of special mandrels, ejector bars, etc. as is disclosed in the U.S. Pat. No. 4,328,945 issued to William J, Perkins on May 11, 1982. Moreover, there is difficulty in inserting the elements into the cells because the ribs must ride on the outer sides of the elements and be flexed thereby, which could cause damage to the separators of the outermost plates of the cell elements. This problem can be alleviated to some extent by making the ribs more flexible, but this makes the molding process more complex.

SUMMARY OF THE INVENTION

The present invention provides a flexible spacer for positioning a core element in a cell compartment of a container of a storage battery. The flexible spacer extends around the cell element, interposed between the cell element and the walls of the cell compartment, filling the space between the cell element and the sides of the cell compartment. The flexible core spacer has a ribbed configuration, enabling the spacer to flex, automatically adjusting for differences in cell element thickness. The ribbed configuration minimizes the contact area between the surfaces of the flexible core spacer and the plate surfaces of the core element, which not only maximizes acid/electrolyte availability, but also enhances cooling. Moreover, the flexible core spacer minimizes the effects of vibration on the cell element, because the flexible spacer is not a rigid support member.

In accordance with a feature of the invention, the flexible core spacer is a one-piece sheet-like member that is folded into a U-shape for use to facilitate inserting the multi-plate cell element into the cell compartment. Because the element is suspended within the flex core spacer, there is no tendency to squeeze the element at its upper edge during the insertion of the multi-plate element into the container cell compartment.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 5 is a top view of a battery compartment illustrating the flex core spacer provided by the invention positioning a core element in the battery compartment;

FIG. 6 is a view similar to that of FIG. 5 and showing the flexible core spacer extended to accommodate a smaller core element in the battery compartment;

FIG. 7 is a plan view of the flexible core spacer provided by the invention;

FIG. 8 is a side view of the flexible core spacer provided by the invention;

FIG. 9 is a rear view of the flexible core spacer provided by the invention;

FIG. 10 is a end view of the flexible core spacer provided by the invention taken in the direction of the arrows 10—10 in FIG. 8;

FIG. 11 is a view of the flexible core spacer shown folded over in its use condition;

FIG. 12 is a view showing a core element assembled with the spacer and positioned in a cell chamber; and FIG. 13 is an enlarged fragmentary view of the flexible core spacer positioned in a cell chamber and illustrating the manner in which the spacer contacts the spacer elements and the walls of the cell chamber.

DESCRIPTION OF A PREFERRED EMBODIMENT

Figure 1:
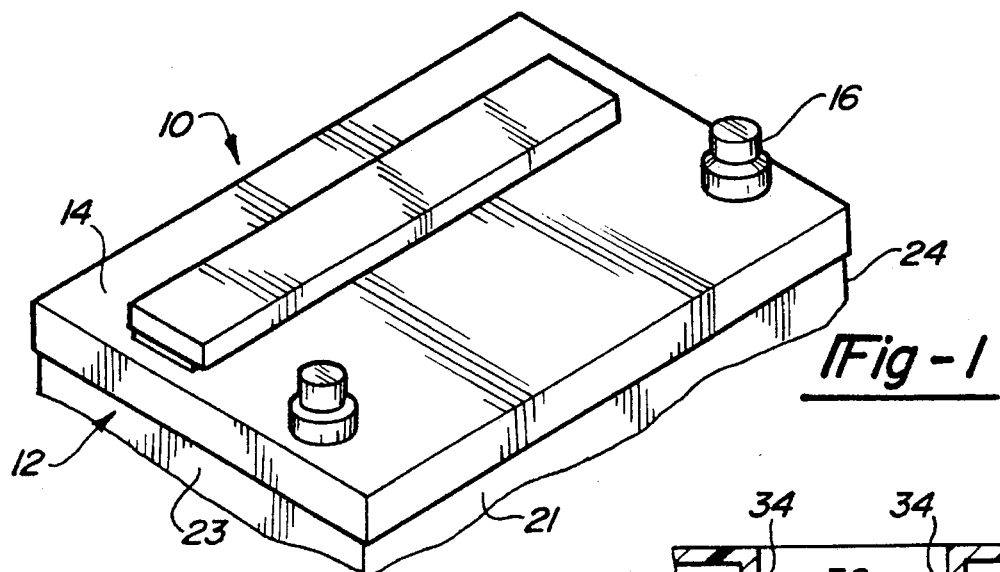
FIG. 1 is a fragmentary view of a battery incorporating the flexible core spacer provided by the invention.

Referring to FIGS. 1 and 5 of the drawings, there is illustrated a battery 10 that incorporates the flexible core spacer 11 provided by the present invention. The battery 10 includes a container 12 for the battery cells and a cover 14 that mounts the positive battery terminal 15 and the negative battery terminal 16. The cover 14 includes vent openings which are covered by covers 17. The container 12 has exterior side walls 21 and 22 and end walls 23 and 24. Integrally constructed with the container 12 are a series of interior partition walls, such as partition walls 25 and 26 shown in FIG. 5, which divide the interior of the container into a plurality of cell compartments, such as compartments 27, 28 and 29. The inner partition walls 25 and 26 as well as the end walls 23 and 24 are flat, that is, they do not contain outwardly projecting ribs. Also, the cell chamber has a flat bottom wall 19.

The flexible core spacer 11 provided by the present invention is used to position a cell element 20 in cell compartment 28 of the battery container 22. The core spacer 50 is adapted to carry the cell element and is insertable with the cell element as a unit into the cell compartment. The cell element 20 is typical of those used in automotive batteries having a series or stack of alternatively spaced positive and negative plates or electrodes 30 separated from one another by separators, with the electrodes of like polarity being electrically connected together in series in the manner known in the art. The flexible core spacer 11 automatically adjusts for differences in element thickness. As will be shown, the flexible core spacer 11 has a ribbed structure that defines first and second corrugated portions for the core spacer enabling the core spacer to vary automatically in width to accommodate cell elements of varying thickness. This is illustrated in FIG. 6, where a cell element 20-1 contains fewer plates (or is thinner for any other reason) than the core element 20 shown in FIG. 5. Although in this case the flexible core spacer 11 is compressed less, the cell element 20-1 is firmly held in position and is compressed to maintain consistent separation between the plates that make up the cell element 20-1, so that the resistivity of the plates is maintained the same and at a low value.

Figure 2:
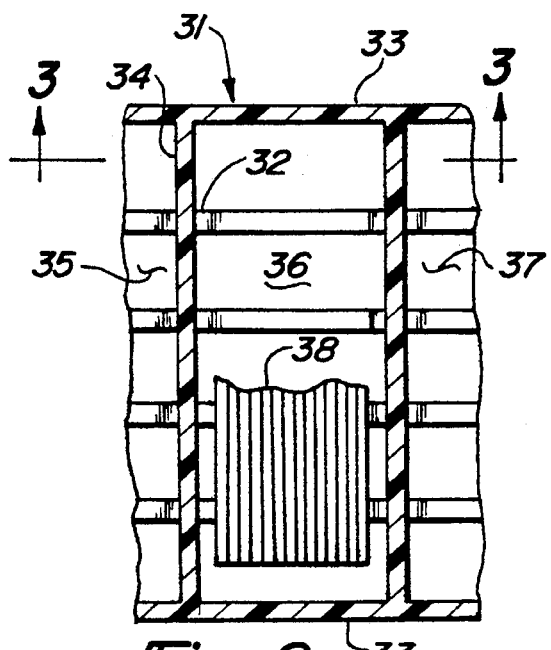
FIG. 2, which is labelled PRIOR ART, is a top view of battery compartment having core spacing ribs formed in the side wall of the compartment.
Figure 3:
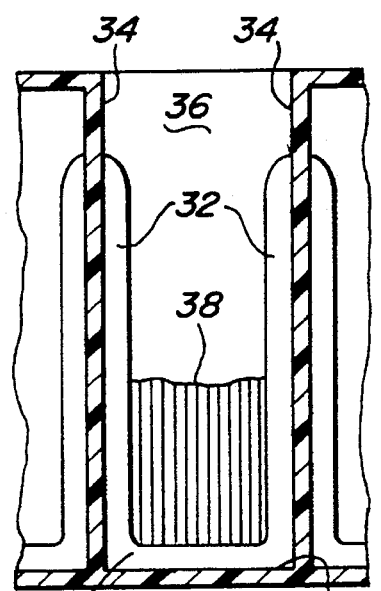
FIG. 3 which is labelled PRIOR ART, is a vertical section view of the battery compartment of FIG. 2.

Digressing, referring to FIGS. 2 and 3, which are labelled "PRIOR ART", there is shown a fragmentary view of a prior art container 31 that is molded with fixed ribs 32. The container has exterior side walls 33 and integrally formed interior partition walls 34 which divide the interior of the container into a plurality of cell compartments, such as compartments 35, 36 and 37. A cell element 38 is shown positioned in cell compartment 36.

Each cell element, such as cell element 38 that is illustrated in FIGS. 2 and 3 of the drawings, is spaced from the partition walls 34 of the cell compartment and is firmly held substantially centrally therein by the ribs 32 that are integrally molded to extend normal to the container walls. These ribs 32 provide a fixed spacing between the partition walls 34 and the cell element 38. The size of the ribs defines the width of the compartment, with wider ribs being used for compartments containing thin cell elements and smaller ribs being used for compartments containing thicker cell elements. Varying the number of plates in turn varies the thickness of the cell element that must be positioned and firmly retained in the cell compartments of the battery. The bottom 40 of the cell compartment 36 has ribs 41 which space the element 38 above the bottom 40 of the cell compartment 36.

Figure 4:
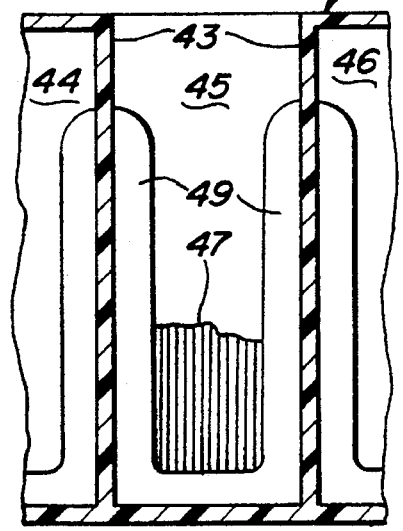
FIG. 4 is a view similar to that of FIG. 3 and showing a battery compartment having larger core spacing ribs.

When a thinner cell element is used, either because fewer plates are used to form the cell element or because the plates used are of a thinner construction, the width of the internal ribs must be increased. Referring to FIG. 4, which is labelled "PRIOR ART", there is shown an embodiment for a container 42 having integrally formed interior partition walls 43 which divide the interior of the container into a plurality of cell compartments, such as compartments 44, 45 and 46. A cell element 47, having fewer plates 48 than cell element 38 (FIG.3), is shown positioned in cell compartment 45. In this embodiment, the ribs 49 are wider than the ribs 32 (FIG.3) to compensate for the reduced thickness of the cell element 47. Thus, several models of such fixed rib containers, each having different sized ribs, must be maintained by the battery manufacturer to produce the various battery assemblies.

Considering the flexible core spacer 11 in more detail, with reference to FIGS. 6–10, the flexible core spacer provided by the present invention is a one-piece, sheet-like member 51 having opposite sides 52 and 53 and opposite ends 54 and 55. The sheet member 51 has three apertures 60 at its center, which in the exemplary embodiment are rectangular in shape. In addition, the sheet member 51 has three ribbed portions 61, 62 and 63 adjacent to end 54 and three ribbed portions 64, 65 and 66 adjacent to end 55. The ribbed portions 61, 62 and 63 extend from end 54 to one side of the apertures 60, defining corrugated sections for the sheet member having alternating grooves and ridges. The ribbed portions 64, 65 and 66 extend from end 55 to the other side of the apertures 60, defining further corrugated sections for the sheet member having alternating grooves and ridges. The intermediate connecting portions 56 and 57, which form the grooves of the corrugated sections, extend continuously the length of the sheet member from end 54 to end 55. The sides 52 and 53 together with the intermediate connecting portions 56 and 57 define a base portion of the flexible core spacer.

The six ribbed portions 61–66 are identical to one another in size and shape, each being generally trapezoidal shaped in cross section and having sides 71 and 72 and top or cross section 74. The top or cross section 74 of each ribbed portion, which form the ridges of the corrugated sections, has an inwardly extending portion 76 reversed defining a reinforcement rib which is rectangular in cross section and which extends the length of the ribbed portion, defining reinforcement ribs for the ridges of the corrugated sections. The ribbed portions 61–66 extend parallel to one another and are evenly spaced transversely of the sheet member. In the exemplary embodiment, the sheet member 51 has three ribbed portions in each half thereof. However, fewer or more ribbed portions could be provided in the sheet member 51.

Similarly, each of the intermediate connecting portions 56 and 57 includes a portion 78 that is directed outwardly from the base portion 79 thereof, defining a reinforcement rib for the grooves of the corrugated sections. The reinforcement rib 78 is rectangular in cross section and extends the length of the intermediate connecting portion. The base portions 79 of each of the intermediate connecting portions 56 and 57 lie in a plane with the sides 52 and 53 of the sheet member as is shown in FIG. 10.

In the exemplary embodiment, the reinforcing ribs 76 and 78 have a rectangular cross section. However, the ribs could have other configurations, such as semicircular, oval, etc. The reinforcing ribs 76 and 78 provide increased rigidity to the core spacer along its vertical extent.

The sheet member 51 is tapered inwardly at its ends 54 and 55, as shown in FIGS. 8 and 12, to facilitate insertion of the cell element into the envelope formed by the folded over sheet member 51 when folded over to its use condition. Also, the ends 54 and 55 of the sheet member 51 have trapezoidal shaped cutouts 80, as shown in FIG. 7, to enhance the flexibility of the sheet member out to its edges at the ends 54 and 55.

Referring to FIGS. 5 and 6, the transverse width of the sheet member 51 is correlated to the width of the cell compartment between the sidewalls 21 and 22 of the container so that when the sheet member is folded over to its use condition, forming the spacer 11, its sides 52 and 53 are spaced inward from the sidewalls 21 and 22 as shown in FIG. 6, and are able to move outward laterally towards the sidewalls 21 and 22 as the spacer is compressed and the ribbed portions 61–66 deflect inwardly which causes the sides 52 and 53 to move laterally outward towards the sidewalls 21 and 22.

As shown in FIG. 12, the length of the sheet member corresponds approximately to twice the vertical length of the partitions 25 and 26 and the separation between these partitions so that when folded over to its use condition, one end 54 of the spacer 11 is located near the top of the partition 25, the other end 55 of the spacer is located near the top of the partition 26 and the apertured bottom of the spacer extends along the bottom wall 19 of the compartment cell.

The sheet member 51 which forms the flexible spacer or insert may be produced by an injection molding process or an extrusion molding process. One sheet member that was produced had a transverse width between sides 52 and 53 of approximately 4 to 5 inches and a length from end 54 to end 55 of approximately 11.5 inches. The thickness of the sheet member was approximately 0.015 to 0.020 inch.

Referring to FIGS. 5, 11 and 12, when the sheet member 51 is folded over to the use condition, the end 54 is disposed opposite to the end 55. The apertures or cutouts 60 result in an open ended area, i.e. an area that is free of ribs, at the bottom of the spacer 11. The center 88 of the ends 52 and 53 and the center 90 of the connecting portions 56 and 57 are interposed between the lower edge of the cell element 20 and the bottom wall 19 the cell compartment 28, spacing the lower edge of the cell element 20 from the bottom wall 19 of the cell compartment, providing flow channels for electrolyte through the open portions defined by the apertures or cutouts 60 (FIG. 7). In addition, the presence of these apertures 60 at the mid-section of the sheet member facilitates folding the sheet member in half to form the pocket for receiving the cell element 20.

In FIG. 12, the cell element 20 is shown positioned in cell chamber 28 and carried by the flexible core spacer 11. The cell element 20, carried by the spacer, is positioned in the cell chamber after the case on strap process but before welding the terminals or straps together. The flexible core spacer aids in the insertion of the core element 20 into the cell chamber 28 because the pocket formed when the sheet member 51 is folded over on itself to form the spacer enables the spacer to act as a carrier for the multi-plate element. The spacer supports the cell element 20 during the insertion of the multi-plate cell element 20 into the container cell compartment so that there is no tendency to squeeze the cell element 20 at its upper edge because the cell element 20 is suspended within the flexible spacer.

As is shown in FIG. 13, when positioned in cell chamber 28, the outer surfaces 92 of the tops 73 of the ribbed portions, such as ribbed portions 64–66, engage the sides, such as side 26, of the cell element. The ribbed configuration of the spacer 11 defines a minimum surface area that engages the cell element 20, thereby maximizing acid or electrolyte availability to the cell element 20. Moreover, the ribbed configuration of the spacer 11 and the apertured bottom portion of the spacer 11 enhances cooling because of the minimal contact with the plates that defines flow channels through the spacer 11. Also, the ribbed configuration for the spacer 11 that provides the flexibility of the spacer 11 minimizes the affect of vibration on the cell element 20 because the flexible spacer is not a rigid support member. Because the flexible spacer automatically adjusts to compensate for variations in the thickness of the cell element, this enables the container to be produced having inner partitions, end walls, and a bottom wall that are flat or "rib-free". This greatly simplifies the production of the container 12 for the battery 10 (FIG. 1).

While the invention has been described with reference to preferred embodiments, various modifications can be made without departing from the spirit and scope of the invention as defined in the appended claims.

We claim:

1. A flexible spacer for positioning in a cell compartment of a storage battery a cell element including a series of alternating positive and negative plates separated by separators, said cell element having first and second opposing side surfaces, said battery including a container having first and second walls which define said cell compartment within said container, said flexible spacer comprising:

a sheet member including first and second spacing portions having first ends joined together by a central portion defining a U-shaped receptacle for receiving and supporting said plates by lower edges of said plates;

said sheet member being adapted to be inserted, with said cell element formed by said positive and negative plates supported therein, into said cell compartment with said first spacing portion interposed between said first side surface of said cell element and said first wall of said container and engaging said first side surface of said cell element and said first wall of said container for spacing said cell element from said first wall of said container and with said second spacing portion interposed between said second side surface of said cell element and said second wall of said container and engaging said second side surface of said cell element and said second wall of said container for spacing said cell element from said second wall of said container;

said first and second spacing portions each having first and second sides;

said first spacing portion including a first plurality of ribs disposed between said first and second sides thereof and said second spacing portion including a second plurality of ribs disposed between said first and second sides thereof, defining respective first and second corrugated sections that flex in spacing said cell element from said first and second walls of said container.

2. The flexible spacer according to claim 1, wherein said first and second corrugated sections each include alternate grooves and ridges, and wherein at least each of said ridges includes a reinforcing rib that extends the length of said ribbed portion.

3. The flexible spacer according to claim 2, wherein each of said grooves includes a reinforcing rib that extends the length thereof.

4. A flexible spacer for positioning in a cell compartment of a storage battery a cell element including a series of alternating positive and negative plates separated by separators, said cell element having first and second opposing side surfaces, said battery including a container having first and second walls which define said cell compartment within said container, said spacer comprising:

a sheet member having first and second sides, first and second ends, and a central portion intermediate said first and second ends, said sheet member having a first ribbed portion extending between said first and second sides from near said first end to said central portion and a second ribbed portion extending between said first and second sides from near said second end to said central portion;

said first end of said sheet member being located in opposing relation with said second end of said sheet member, defining a generally U-shaped receptacle for receiving and supporting said plates;

said sheet member being adapted to be inserted, with said cell element formed by said positive and negative plates supported therein, into said cell compartment with said first ribbed portion interposed between said first side surface of said cell element and said first wall of said cell compartment and engaging said first side surface of said cell element and said first wall of said container for spacing said cell element from said first wall of said cell compartment and with said second ribbed portion being interposed between said second side surface of said cell element and said second wall of said cell compartment and engaging said second side surface of said cell element and said second wall of said container for spacing said cell element from said second wall of said cell compartment;

said first and second ribbed portions permitting said sheet member to flex in spacing said cell element from said first and second walls of said cell compartment.

5. The flexible spacer according to claim 4, wherein said first ribbed portion includes a first plurality of ribs which extend parallel to one another between said first and second sides on section of said sheet member, and wherein said second ribbed portion includes a second plurality of ribs which extend parallel to one another between said first and second sides in another section of said sheet member.

6. The flexible spacer according to claim 4, wherein said first and second ribbed portions define respective first and second corrugated sections each including alternate grooves and ridges, and wherein at least each of said ridges includes a reinforcing rib that extends the length of the ribbed portion.

7. The flexible spacer according to claim 6, wherein each of said grooves includes a reinforcing rib that extends the length of the sheet from said first end to said second end.

8. The flexible spacer according to claim 6, wherein said sheet includes a plurality of connecting portions each located between a pair of adjacent ribbed portions, interconnecting said adjacent ribbed portions, and wherein each of said ribbed portions is generally trapezoidal in cross section and includes first and second sides that slant outwardly from said connecting portions and a cross portion interconnecting said first and second sides, said reinforcing rib being formed in said cross section.

9. The flexible spacer according to claim 8, wherein said side surfaces of said cell element are engaged by said cross portion of said ribbed portions, thereby minimizing the area of contact between said sheet member and said side surfaces of said cell element.

10. The flexible spacer according to claim 4, wherein said sheet member includes a plurality of apertures in its central portion.

11. The flexible spacer according to claim 4, wherein said central portion of said sheet member defines an apertured bottom portion for said sheet member for spacing the lower portion of said cell element from a bottom wall of said cell compartment.

12. The flexible spacer according to claim 4, wherein said sheet member is tapered at said first and second ends.

13. A method for positioning at least one cell element of a battery in a cell compartment of the battery container, said cell element including a series of alternating positive and negative plates, and said cell element having first and second opposing side surfaces, comprising:

providing a flexible sheet member having first and second ends and including first and second ribbed portions extending between said first and second ends;

folding said sheet member in half to locate said first end in opposing relation with said second end to form a U-shaped spacer having first and second opposing sections with said first ribbed portion on said first section of said sheet member and said second ribbed portion on said second section of said sheet member;

placing said cell element between said first and second opposing sections of said sheet member;

inserting said sheet member, with said cell member formed by said positive and negative plates supported therein, into said cell compartment with the first section interposed between said first side surface of said cell element and a first wall of said cell compartment and engaging said first side surface and said first wall and with the second section interposed between said second side surface of said cell element and a second wall of said cell compartment and engaging said second side surface and said second wall, causing the ribbed portions to flex to conform to the space between said cell element and said first and second walls of said cell compartment.

14. A spacer for positioning a cell element, having first and second surface portions and a bottom portion, within a compartment, having first and second wall portions and a bottom portion, of a storage battery container, the spacer comprising:

a support member having an inner wall portion and an outer wall portion, the inner and outer wall portions being joined in spaced apart relation by a resilient joining member and wherein the inner wall portion is adapted to engage the first and second surface portions of the plate stack and the outer wall portion is adapted to engage the first and second wall portions of the compartment.

15. The spacer of claim 14 wherein the resilient joining member is elastically deflected when the inner wall portion engages the plate stack and the outer wall portion engages the compartment.

16. The spacer of claim 14 further comprising a base portion, the base portion having an inner surface adapted to engage the bottom portion of the cell element and an outer surface adapted to engage the bottom portion of the compartment.

17. The spacer of claim 14 wherein the support member further comprises first and second support members joined by a base portion, the base portion having an inner surface adapted to engage the bottom portion of the cell element and an outer surface adapted to engage the bottom portion of the compartment.

* * * * *